United States Patent
Mao

[19]

[11] Patent Number: 6,115,274
[45] Date of Patent: Sep. 5, 2000

[54] FREQUENCY MODULATION CONTROLLER FOR SINGLE-SWITCH, POLYPHASE, DCM BOOST CONVERTER AND METHOD OF OPERATION THEREOF

[75] Inventor: Hengchun Mao, Plano, Tex.

[73] Assignee: Lucent Technologies Inc., Murray Hill, N.J.

[21] Appl. No.: 09/324,074

[22] Filed: Jun. 1, 1999

[51] Int. Cl.$^7$ ........................................... H02M 5/42
[52] U.S. Cl. ........................... 363/89; 323/222; 323/288
[58] Field of Search ............................. 363/89; 323/288, 323/222

[56] References Cited

PUBLICATIONS

Jang and Jovanovic, "A new input–voltage feedforward harmonic–injection technique with nonlinear gain control for single–switch, three–phase, DCM boost rectifiers", IEEE, pp. 885–887; Mar. 1999.

Jang and Jovanovic, "A comparative study of single–switch, three–phase, high–power–factor rectifiers", IEEE, pp. 1095–1096; Feb. 1998.

*Primary Examiner*—Peter S. Wong
*Assistant Examiner*—Gary L Laxton

[57] ABSTRACT

A controller for a polyphase discontinuous conduction mode (DCM) boost converter, a method of controlling a DCM boost converter and a DCM boost converter incorporating the controller or the method to reduce its input current distortion. The DCM boost converter (which typically has only a single switch) includes: (1) a ripple detector, coupled to a polyphase input of the DCM boost converter, that develops a ripple signal based on an input ripple voltage and (2) a harmonic modulator, coupled to the ripple detector, that develops a ramp signal based on the ripple signal and a control signal and controls a switching frequency and a duty cycle of a switch in the DCM boost converter based on the ramp signal and an output voltage excursion signal.

21 Claims, 2 Drawing Sheets

FREQUENCY MODULATION CONTROLLER FOR SINGLE-SWITCH, POLYPHASE, DCM BOOST CONVERTER AND METHOD OF OPERATION THEREOF

TECHNICAL FIELD OF THE INVENTION

The present invention is directed, in general, to power conversion and, more specifically, to a three-phase boost converter and a method of operating the same.

BACKGROUND OF THE INVENTION

A single-switch three-phase discontinuous conduction mode ("DCM") boost converter is widely used in three-phase power factor correction applications, mainly due to its uncomplicated design and simple control circuit. There are, however, certain drawbacks in its use, primarily because the circuit has a high content of harmonic currents with a corresponding harmonic distortion unless the input peak voltage is significantly lower than the output voltage. In the case of a 800V output converter with a 380V rms input, 800V output converter, the input power must be limited to amounts below 6 kW in order to meet IEC 1000-3-2 harmonic current requirement with the traditional pulse width modulated ("PWM") control.

In order to expand the power capability of a single-switch three-phase DCM boost converter, several alternative approaches have been suggested. One proposal made was to control the converter in a critical condition mode, that is, when the current in the freewheeling diode reaches zero, the main switch is turned on again. This concept is covered in J. W. Kolar, H. Ertl, and F. C. Zach, "*Space Vector-Based Analytical Analysis of the Input Current Distortion of a Three-Phase Discontinuous-Mode Rectifier System,*" Records of Power Electronics Specialist Conference, pp. 696–703, 1993, a copy of which is incorporated herein by this reference. The very wide, load-dependent switching frequency of this proposal, however, made the design of the electromagnetic interference ("EMI") filter very difficult.

In a DCM converter, the high-frequency averaged current is proportional to the square of the duty cycle of the main switch divided by the switching frequency ($d^2/f_s$). This means the input current waveform can be improved by either changing the duty cycle or switching frequency. The possibility of modulating the main switch duty cycle with a harmonic waveform has been investigated. Q. Huang and F. C. Lee, "*Harmonic Reduction in Single-Switch, Three-Phase Boost Rectifier With High Order Harmonic Injected PWM,*" in VPEC Seminar Rec., Blacksburg, Va., September 1995, a copy of which is incorporated herein by this reference. In this case a multiplier is required because the modulated waveform should be proportional to the dc component of the duty cycle, which changes with the load power.

Accordingly, what is needed in the art is an expansion of the power capability of a single-switch three-phase DCM boost converter, without resorting to complex circuitry and control schemes, where EMI filtering requirements can be reduced and a multiplier is not required for a modulated waveform.

SUMMARY OF THE INVENTION

To address the above-discussed deficiencies of the prior art, the present invention provides a controller for a polyphase discontinuous conduction mode (DCM) boost converter, a method of controlling a DCM boost converter and a DCM boost converter incorporating the controller or the method. In one embodiment, the DCM boost converter (which typically has only a single switch) includes: (1) a ripple detector, coupled to a polyphase input of the DCM boost converter, that develops a ripple signal based on the AC input/voltages and (2) a harmonic modulator, coupled to the ripple detector, that develops a ramp signal based on the ripple signal and a control signal and controls a switching frequency and a duty cycle of a switch in the DCM boost converter based on the ramp signal and an output voltage excursion signal.

The present invention therefore introduces a novel controller for a polyphase DCM converter that is substantially independent of the load condition of the converter and therefore does not require a multiplier. The input current waveform of the converter is improved by changing switching frequency over a cycle of the input voltage waveform. If the three-phase input voltages are balanced, the switching frequency is modulated at a frequency of six times the line frequency.

In one embodiment of the present invention, the ripple detector comprises a voltage sensor coupled to the polyphase input. The voltage sensor may be a signal transformer or any other suitable conventional or later-discovered voltage sensing circuit and preferably generates a voltage signal that is in phase, 30° out of phase or a multiple of 30° out of phase.

In one embodiment of the present invention, the ripple detector comprises a rectifier, coupled to the polyphase input and a DC-blocking capacitor coupled to the rectifier. In an embodiment to be illustrated and described, the rectifier and DC-blocking capacitor cooperate to provide the ripple signal.

In one embodiment of the present invention, the harmonic modulator comprises an amplifier that biases the ripple signal with a DC signal representing the control voltage which roughly determines the average switching frequency.

In one embodiment of the present invention, the harmonic modulator comprises a ramp generator that generates the ramp signal based on the ripple signal and the control voltage. Those skilled in the pertinent art are familiar with ramp generators. The ramp generator, as with all other components and circuits of the present invention, can be analog or digital and discrete or integrated.

In one embodiment of the present invention, the harmonic modulator comprises a voltage controller coupled to an output of the DCM boost converter. The voltage controller senses an output voltage of the DCM boost converter, receives a voltage reference signal and develops the output voltage excursion signal therefrom.

In one embodiment of the present invention, the modulator comprises a comparator that develops a gate drive signal based on the ramp signal and the output voltage excursion signal.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
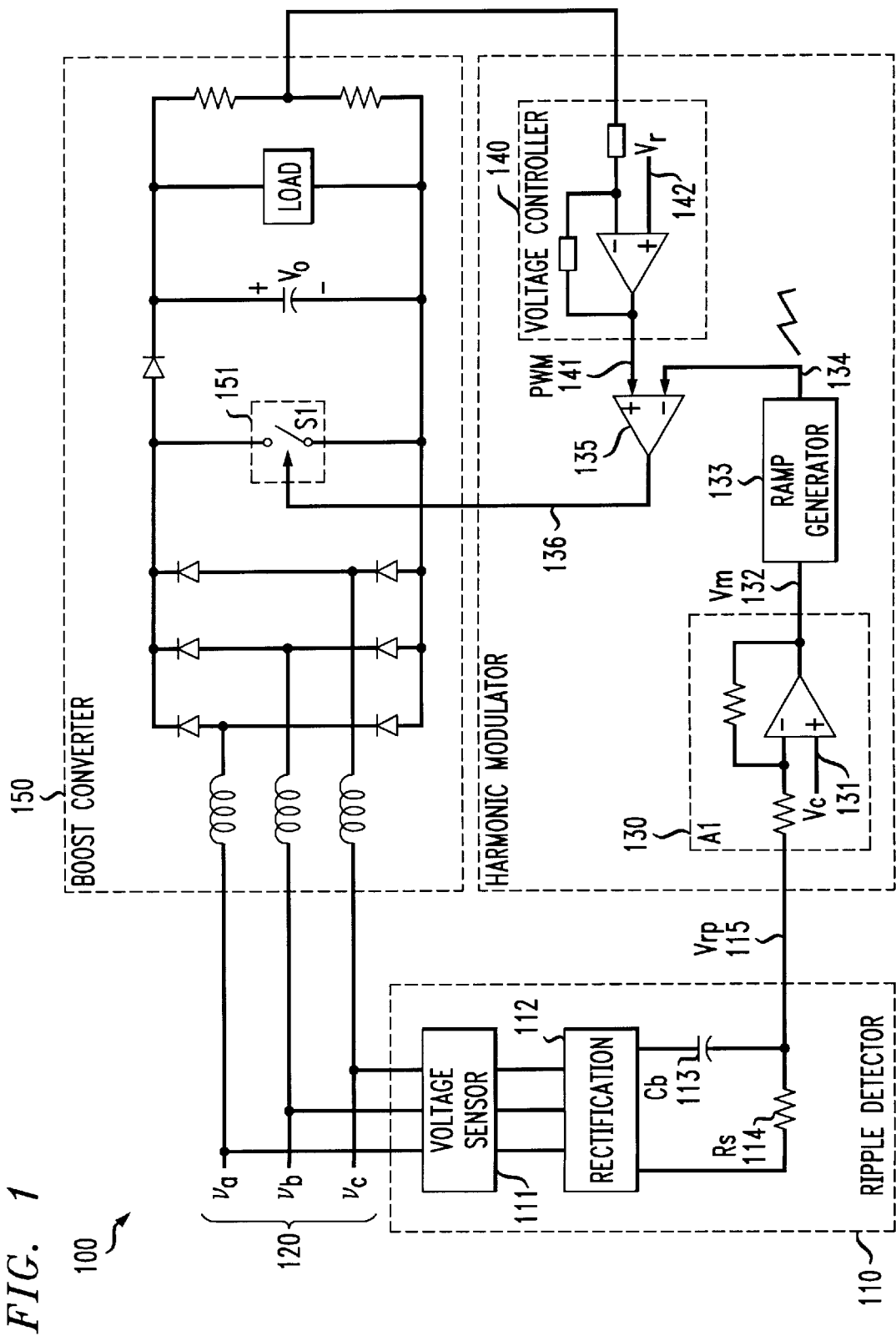
FIG. 1 illustrates a circuit for a single-switch three-phase DCM boost converter that incorporates a frequency modulation controller.

Referring initially to FIG. 1, illustrated is a circuit 100 for a single-switch three-phase DCM boost converter 150 incorporating a frequency modulation controller. In this embodiment of the invention, a ripple detector 110 is coupled to the polyphase input, that, in this instance, is a three-phase input 120 to the DCM boost converter 150.

One constituent part of the ripple detector 110, is the voltage sensor 111 that is coupled directly to the three-phase input 120 to the boost converter 150. The voltage sensor 111 can be a signal transformer or any other suitable conventional or later-discovered voltage sensing circuit. The voltage output of the voltage sensor 111 can be in phase, or with a shift of 30°, or a multiple of 30°, from the input voltage 120.

The three-phase output of the voltage sensor 111 is processed by a rectifier 112 and dc-blocking capacitor 113 that cooperate to provide a ripple signal 115. The sensed voltage 111 is rectified by the rectifier circuit 112 after which the dc component of the three-phase rectified voltage is blocked by the capacitor 113. The voltage signal across the sensing resistor 114 is the ripple voltage 115 (Vrp).

In this embodiment of the invention, the harmonic modulator has an amplifier 130 to bias the ripple signal 115 with a dc control voltage 131 (Vc) signal. The ripple voltage signal 115, consisting mainly of 6th-order line-frequency harmonics, is processed by the amplifier 130 to add the bias dc control voltage 131 component. The resultant harmonic-modulated signal 132 (Vm) is processed by the ramp generator 133 to produce a ramp signal 134 that is supplied to a comparator 135. Those skilled in the pertinent art will be familiar with ramp generators, which, as with all other components and circuits of the present invention, can be analog or digital and discrete or integrated.

A voltage excursion signal 141 is supplied to the differential amplifier 135 by the voltage controller 140. The voltage controller 140 develops the voltage excursion signal 141 by sensing the output voltage of the DCM boost converter 150 and processing it with a voltage reference signal 142. The voltage excursion signal 141 is supplied to the comparator 135 where it is compared with the harmonic-modulated amp signal 134 in order to produce a pulse width modulated signal 136. The pulse width modulated signal 136 controls the switching frequency and duty-cycle of the power switch 151. Those skilled in the art will understand that low-pass filters can be added to any stage of the above process, if desired.

In the case of a voltage sensor 111 having a phase-shift of 0° or even multiples of 30°, the amplifier 130 is set so that the ripple signal 115 voltage has a negative gain so that the ripple signal 115 voltage is negative in order to increase the modulating signal 132 voltage at the peak of any phase voltage. If the peak of the ramp signal 134 is fixed, this results in an increased switching frequency and reduced average phase currents.

The harmonic modulation should be properly arranged so that, at the peak of each phase voltage 120, a reduction of current in the corresponding phase is achieved. For a voltage sensor 111 with a phase-shift of an odd multiple of 30°, the amplifier 130 will be arranged to have a positive gain for the ripple signal 115 voltage.

The present invention, therefore, introduces a novel circuit for a controller of a polyphase DCM converter that is substantially independent of the load condition of the converter. Because the average switching frequency is independent of the converter load condition, the modulating circuit does not need a multiplier. The input current waveform of the converter is improved by changing switching frequency over a cycle of the input current waveform. In addition, the frequency modulation spreads the high-frequency harmonic energy, and thus helps to reduce EMI filtering requirements.

Figure 2A:
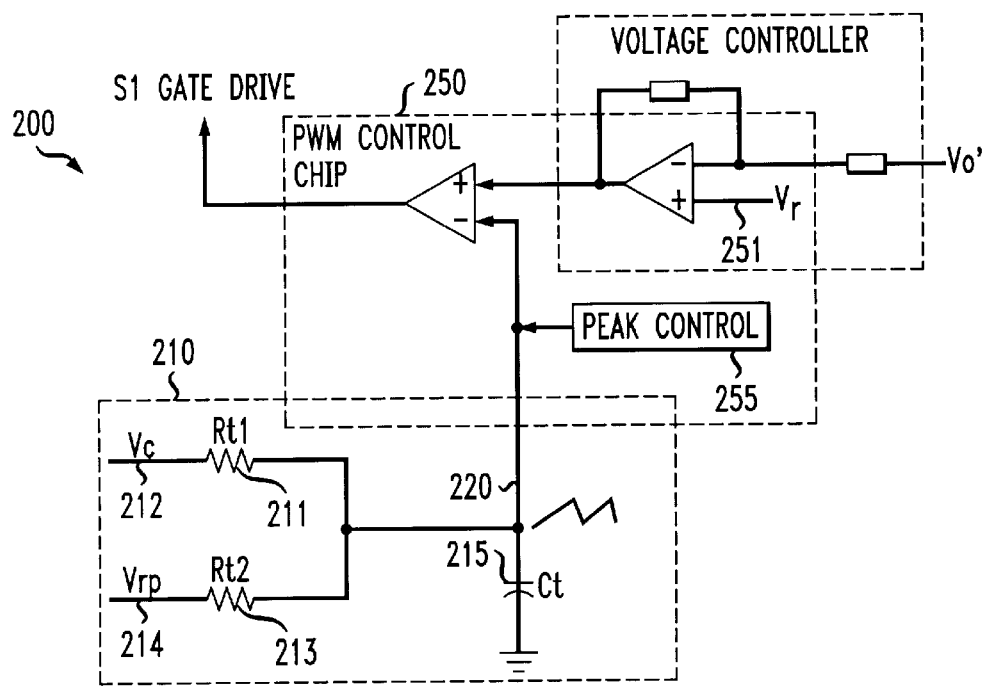
FIG. 2A illustrates an embodiment of the invention where control of the single-switch is implemented around a low cost PWM control chip.
Figure 2B:
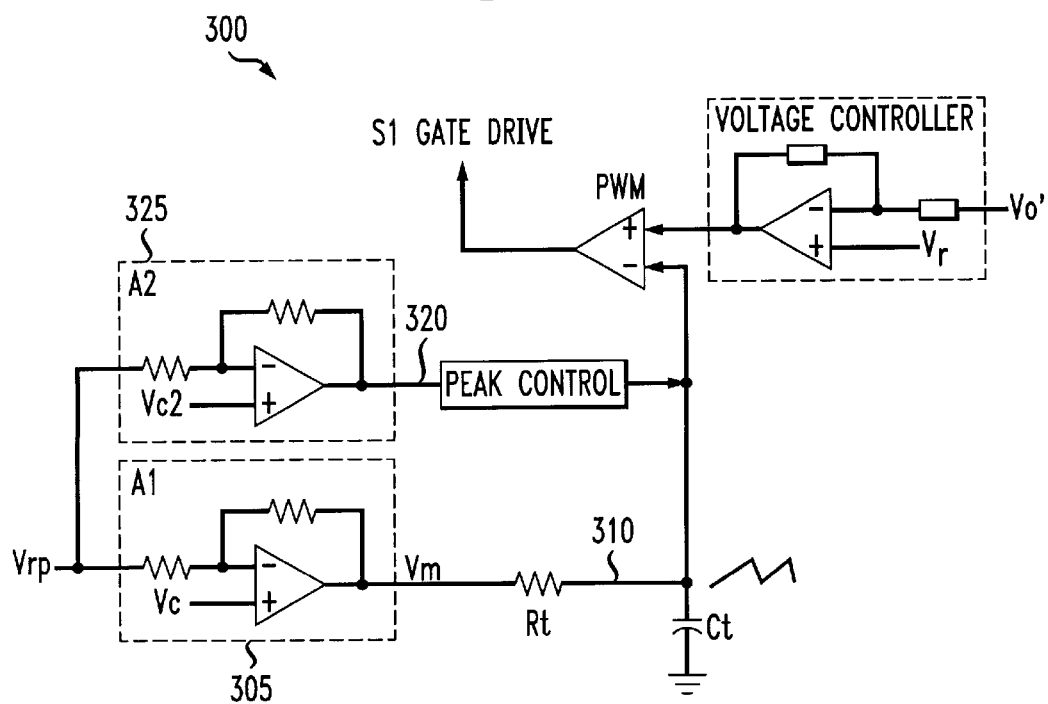
FIG. 2B illustrates a circuit where the single-switch duty cycle can be modulated to expand or reduce the frequency range if the desired frequency modulation range is wider or narrower than the range obtained from the circuit illustrated in FIG. 2A for given input/output conditions.

Turning now to FIGS. 2A and 2B, illustrated are additional embodiments of a frequency modulation controller for a single-switch three-phase DCM boost converter. FIG. 2A illustrates a circuit for an embodiment of the invention where control of the switch 151 is implemented around a low cost PWM control chip 250. The PWM chip 250 has a voltage reference 251 (Vr) for an output voltage, a ramp control circuit 255 to maintain a constant peak of the ramp voltage, and basic PWM functions. Vo' is a signal derived from, and is generally proportional to, the output voltage of the DCM boost converter 150 illustrated in FIG. 1.

The ramp generator 210 is an RC circuit. A control voltage 212 is input to resistor 211 and the ripple voltage 214 is input to resistor 213. The connection of resistor 211 and resistor 213 adds the ripple voltage signal 214 and the control voltage signal 212, with their respective weights determined by the ratio of their resistances. The ramp signal, which is the voltage across the capacitor 215, is modulated by the ripple voltage 214 through resistor 213. The harmonic-modulated signal 220 is then supplied to the PWM control chip 250. The function of the RC circuit is similar to the amplifier 130 illustrated in FIG. 1, except that the gain is positive for the ripple voltage 214. Other circuits can also be used and be within the scope of the invention as long as the charging current is controlled by the harmonic modulated signal 220.

In the embodiment illustrated in FIG. 2A, when the ripple voltage 214 is positive, the switching frequency is increased and average current is reduced. This is because the duty cycle is not changed by the modulation due to the constant peak of the ramp signal. The illustrated circuit 200 works with a voltage sensor having a phase-shift of an odd multiple of 30°.

Turning now to FIG. 2B, illustrated is a circuit 300 where the switch duty cycle can be modulated to expand or reduce the frequency range if the desired frequency modulation range is wider or narrower than the range obtained from the circuit in FIG. 2A for given input/output conditions. In order to obtain the same result, a higher duty cycle requires a higher switching frequency and lower duty cycle requires a lower switching frequency.

In order to achieve a higher or lower switching frequency, the peak of the ramp signal voltage 310 is modulated by the ripple signal voltage 320 at output of amplifier 325. Since the peak of the ramp signal voltage 310 will change the duty cycle in a PWM converter 150, this circuit 300 actually results in harmonic modulation of the duty cycle and the switching frequency. This is possible because the average current in a phase is proportional to $d^2/f_s$ as previously described. Because the two amplifiers 305, 325 can be configured to have different positive or negative gains, the modulation effect on the duty cycle and switching frequency can be independently controlled. The polarities of amplifiers 305, 325, and 130 are for illustration purpose only, and can be reversed to achieve desired effects. This is a particularly advantageous embodiment of the present invention because, for the same effect on the input current, there is freedom to choose modulation gains in order to optimize other parameters, such as the frequency modulation range.

From the above, it is apparent that the present invention provides, not only improved current quality, but reduced high-order harmonic currents at the multiples of the switching frequency. The invention is a useful technique for incorporating a frequency modulation controller that expands the power range of a single-switch three-phase DCM boost converter 150.

The foregoing has outlined, rather broadly, preferred and alternative features of the present invention so that those skilled in the art may better understand the detailed description of the invention. Although the present invention has been described in detail, those skilled in the art should understand that they can make various changes, substitutions and alterations herein without departing from the spirit and scope of the invention in its broadest form.

What is claimed is:

1. A controller for a polyphase discontinuous conduction mode (DCM) boost converter, comprising:
    a ripple detector, coupled to a polyphase input of said DCM boost converter, that develops a ripple signal based on an input ripple voltage; and
    a harmonic modulator, coupled to said ripple detector, that develops a ramp signal based on said ripple signal and a control signal and controls a switching frequency and a duty cycle of a switch in said DCM boost converter based on said ramp signal and an output voltage excursion signal.

2. The controller as recited in claim 1 wherein said ripple detector comprises a voltage sensor coupled to said polyphase input.

3. The controller as recited in claim 1 wherein said ripple detector comprises a rectifier, coupled to said polyphase input and a DC-blocking capacitor coupled to said rectifier, that cooperate to provide said ripple signal.

4. The controller as recited in claim 1 wherein said harmonic modulator comprises an amplifier that biases said ripple signal with a DC signal representing said control signal.

5. The controller as recited in claim 1 wherein said harmonic modulator comprises a ramp generator that generates said ramp signal based on said ripple signal and said control signal.

6. The controller as recited in claim 1 wherein said harmonic modulator comprises a voltage controller, coupled to an output of said DCM boost converter, that senses an output voltage of said DCM boost converter, receives a voltage reference signal and develops said output voltage excursion signal therefrom.

7. The controller as recited in claim 1 wherein said modulator comprises a comparator that develops a modulation signal based on said ramp signal and said output voltage excursion signal.

8. A method of controlling a polyphase discontinuous conduction mode (DCM) boost converter, comprising:
    developing a ripple signal based on an input ripple voltage; and
    developing a ramp signal based on said ripple signal and a control signal; and
    controlling a switching frequency and a duty cycle of a switch in said DCM boost converter based on said ramp signal and an output voltage excursion signal.

9. The method as recited in claim 8 wherein said developing said ripple signal comprises sensing a voltage at a polyphase input of said DCM boost converter.

10. The method as recited in claim 8 wherein said developing said ripple signal comprises:
    rectifying a voltage signal representing a voltage at a polyphase input of said DCM boost converter; and
    blocking a DC component of said voltage signal.

11. The method as recited in claim 8 wherein said developing said ramp signal comprises biasing said ripple signal with a DC signal representing said control signal.

12. The method as recited in claim 8 wherein said developing said ramp signal comprises employing a ramp generator to generate said ramp signal based on said ripple signal and said control signal.

13. The method as recited in claim 8 wherein said controlling comprises:
    sensing an output voltage of said DCM boost converter;
    receiving a voltage reference signal; and
    developing said output voltage excursion signal therefrom.

14. The method as recited in claim 8 wherein said controlling comprises comparing said ramp signal and said output voltage excursion signal.

15. A polyphase discontinuous conduction mode (DCM) boost converter, comprising:
    a polyphase inductor circuit coupled to an input of said DCM boost converter;
    a polyphase rectifier coupled to said polyphase inductor circuit;
    a controllable switch coupled to said polyphase rectifier;
    an output capacitor coupled to an output of said DCM boost converter; and
    a controller, including:
        a ripple detector, coupled to said input, that develops a ripple signal based on an input ripple voltage and
        a harmonic modulator, coupled to said ripple detector, that develops a ramp signal based on said ripple signal and a control signal and controls a switching frequency and a duty cycle of said controllable switch based on said ramp signal and an output voltage excursion signal.

16. The DCM boost converter as recited in claim 15 wherein said ripple detector comprises a voltage sensor coupled to said polyphase input.

17. The DCM boost converter as recited in claim 15 wherein said ripple detector comprises a rectifier, coupled to said polyphase input and a DC-blocking capacitor coupled to said rectifier, that cooperate to provide said ripple signal.

18. The DCM boost converter as recited in claim 15 wherein said harmonic modulator comprises an amplifier that biases said ripple signal with a DC signal representing said control signal.

19. The DCM boost converter as recited in claim 15 wherein said harmonic modulator comprises a ramp generator that generates said ramp signal based on said ripple signal and said control signal.

20. The DCM boost converter as recited in claim 15 wherein said harmonic modulator comprises a voltage controller, coupled to an output of said DCM boost converter, that senses an output voltage of said DCM boost converter, receives a voltage reference signal and develops said output voltage excursion signal therefrom.

21. The DCM boost converter as recited in claim 15 wherein said modulator comprises a comparator that develops a modulation signal based on said ramp signal and said output voltage excursion signal.

* * * * *